G. B. WEBB.
TYPE WRITING MACHINE.
APPLICATION FILED SEPT. 1, 1903.

997,482.

Patented July 11, 1911.
6 SHEETS—SHEET 2.

Witnesses:
K. V. Donovan.
Charles E. Smith

Inventor:
George B. Webb
by Jacob Felbel
His Attorney

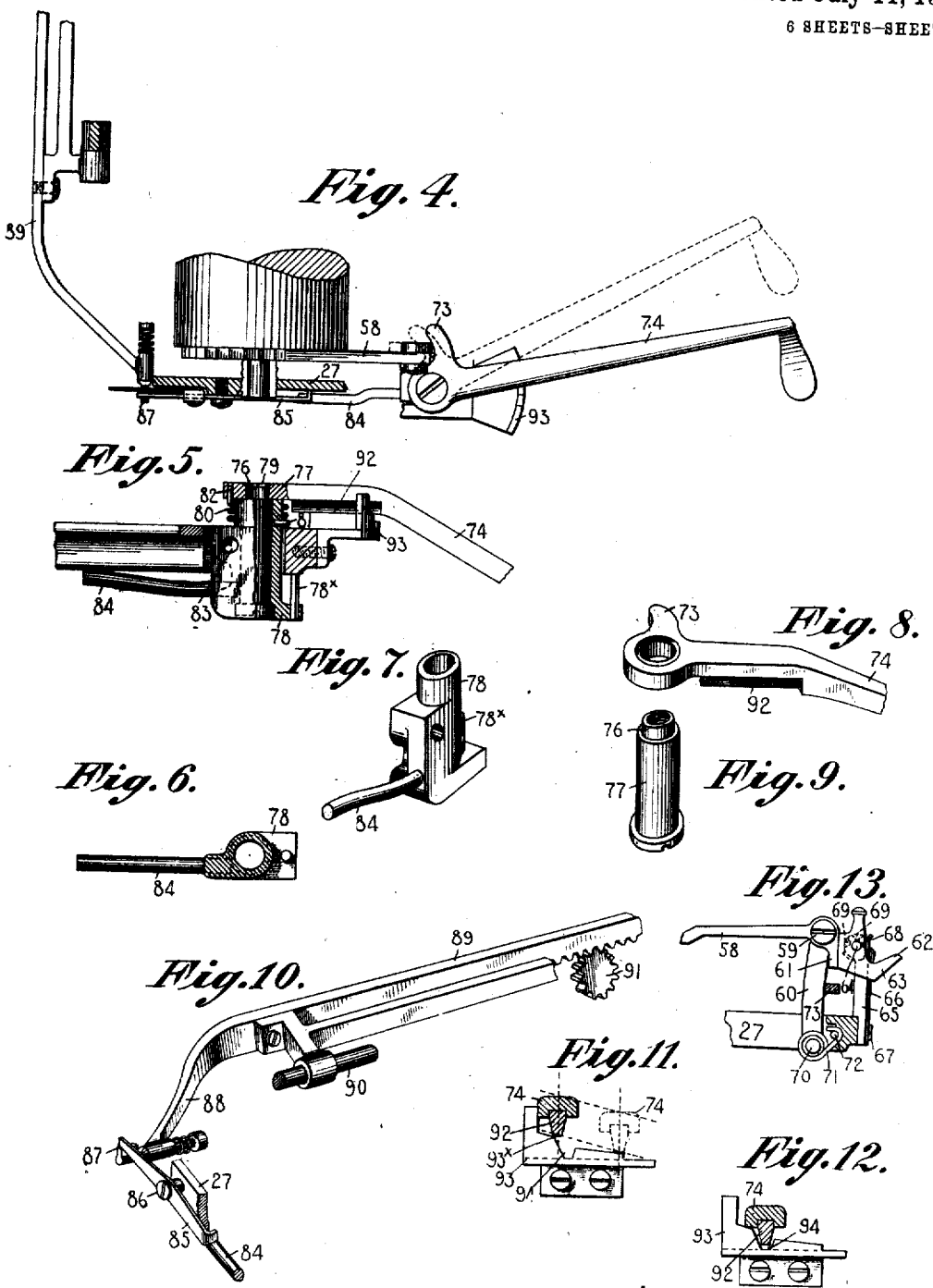

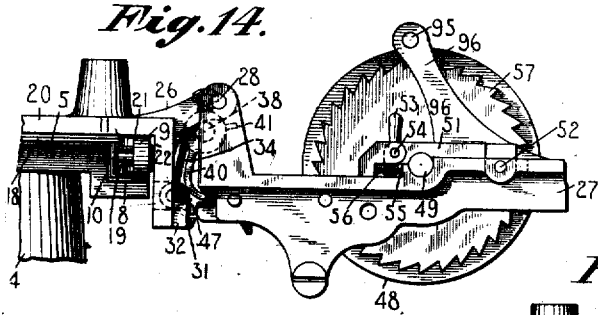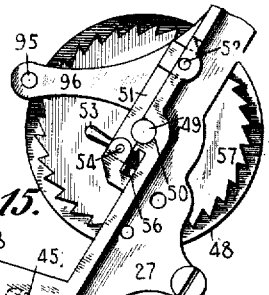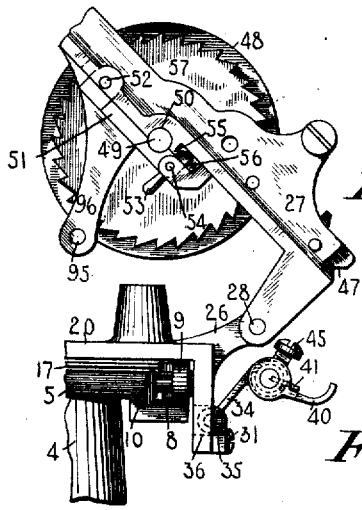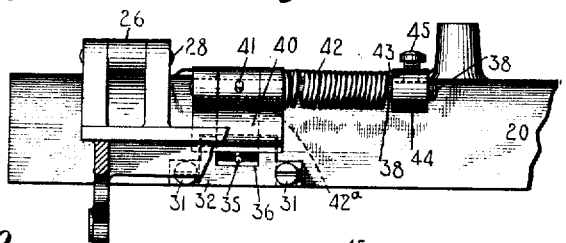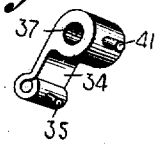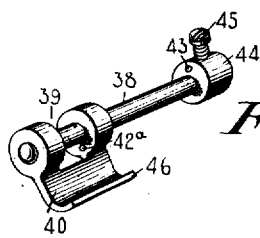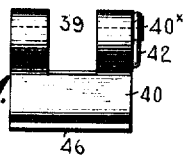

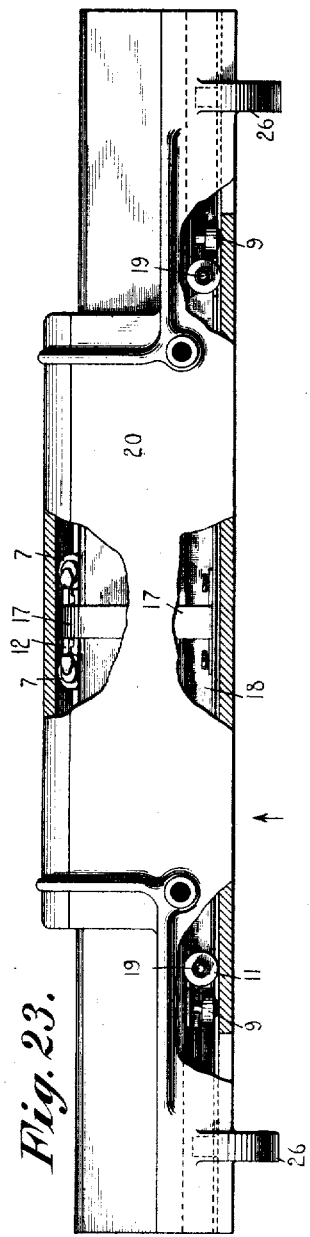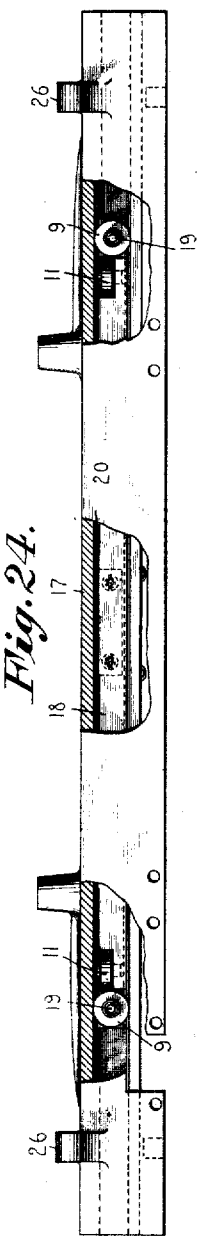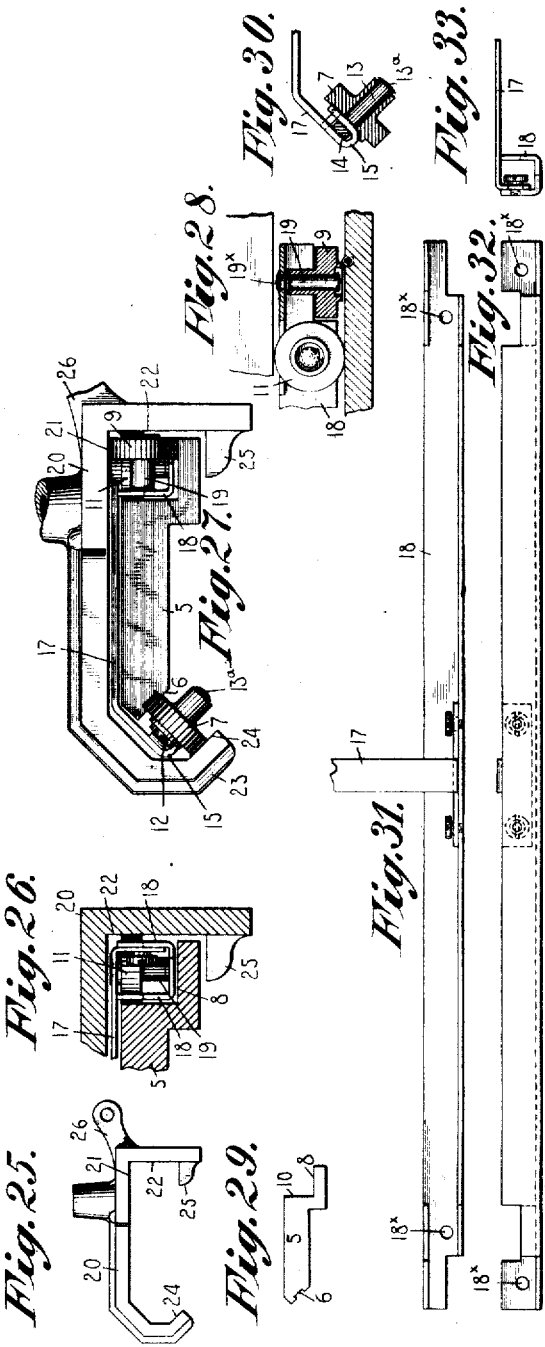

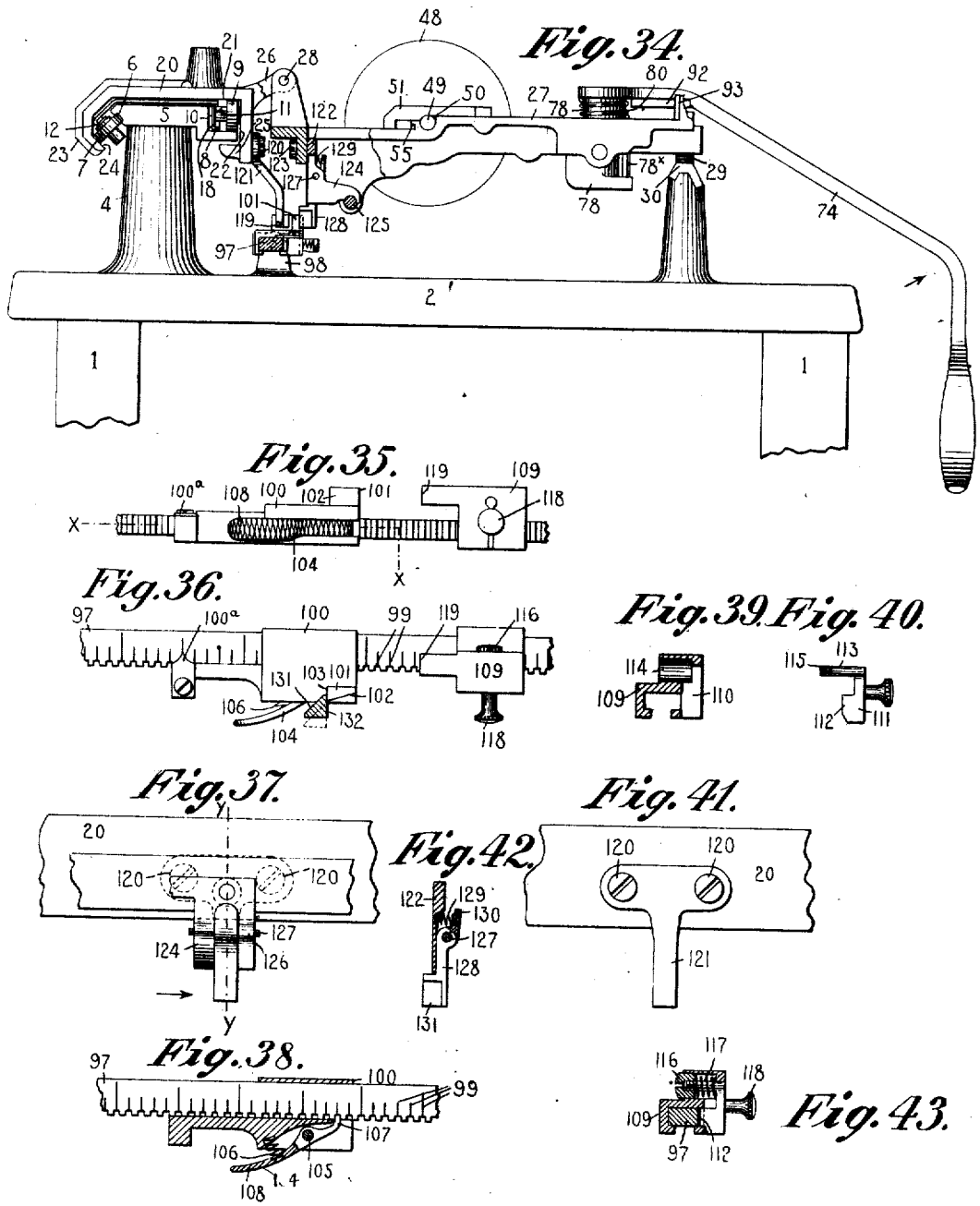

UNITED STATES PATENT OFFICE.

GEORGE B. WEBB, OF WESTFIELD, NEW JERSEY, ASSIGNOR TO WYCKOFF, SEAMANS & BENEDICT, OF ILION, NEW YORK, A CORPORATION OF NEW YORK.

TYPE-WRITING MACHINE.

997,482. Specification of Letters Patent. Patented July 11, 1911.

Application filed September 1, 1903. Serial No. 171,507.

*To all whom it may concern:*

Be it known that I, GEORGE B. WEBB, citizen of the United States, and resident of Westfield, in the county of Union and State of New Jersey, have invented certain new and useful Improvements in Type-Writing Machines, of which the following is a specification.

My invention relates to typewriting machines and is directed to various improvements in the carriage structure, such for instance as the means for mounting the truck; the means for supporting the platen frame and platen when swung back; the hand lever and the different parts controlled thereby.

The object of my invention is to provide simple and efficient means of the characters specified and mechanisms which will overcome many of the disadvantages inherent in the structures heretofore devised.

To these and other ends which will hereinafter appear, my invention consists in the novel arrangement and combinations of parts described in the following specification and particularly pointed out in the appended claims.

Figure 1:
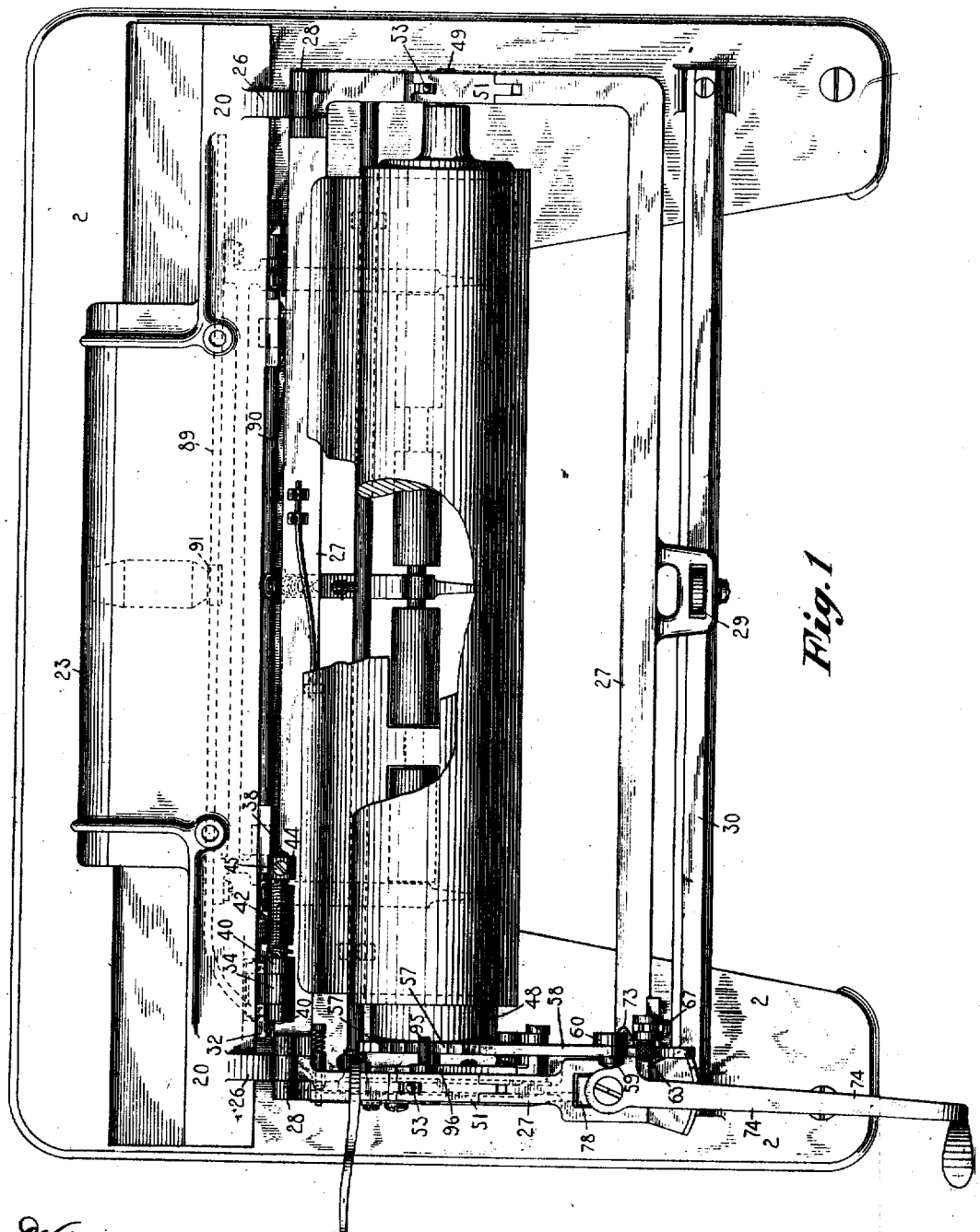
Figure 2:
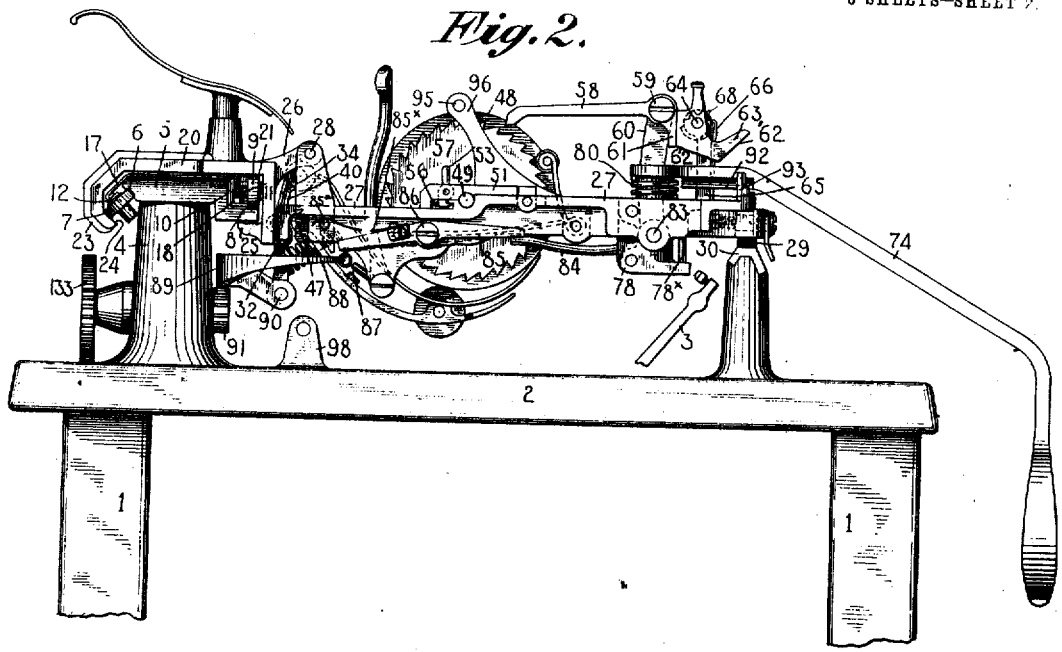
Figure 3:
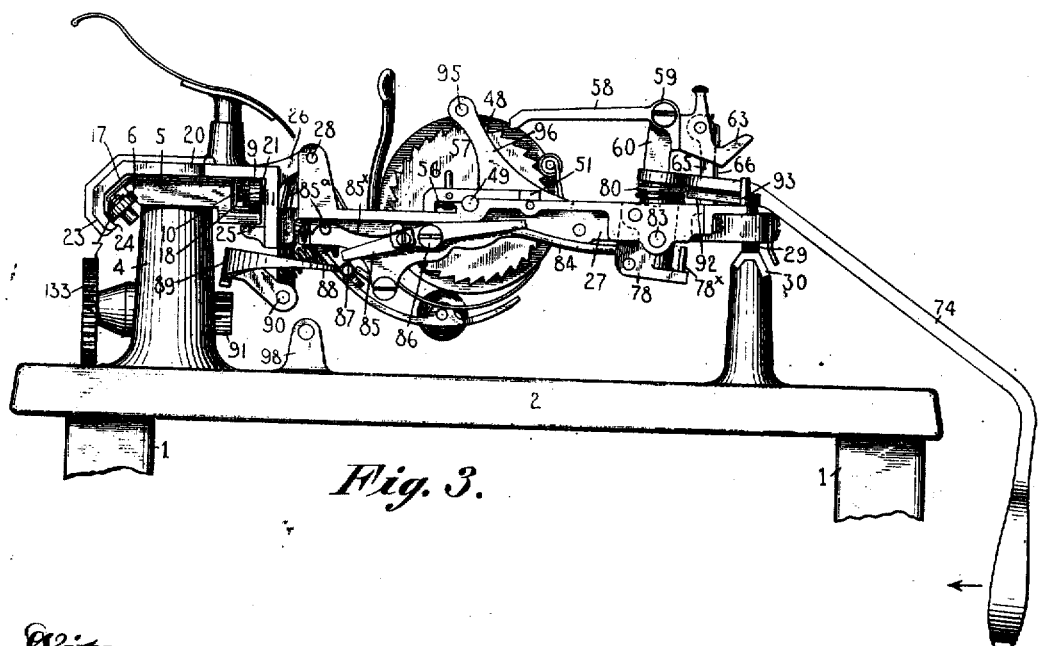

In the accompanying drawings, wherein like reference characters designate corresponding parts in the various views, Figure 1 is a plan view of a sufficient number of parts of one form of typewriting machines to illustrate my invention. Fig. 2 is a left-hand end view of the same. Fig. 3 is a like view of the same showing the hand lever depressed and the feed rack disengaged from the feed pinion. Fig. 4 is a detail top view with parts in section of certain of the mechanism at the left-hand end of the carriage. Fig. 5 is an enlarged detail side view with parts in section of a means for supporting the so-called controlling or hand lever. Fig. 6 is a detail transverse sectional view of the carrier for the controlling or hand lever. Fig. 7 is a perspective view of the same. Fig. 8 is a perspective view of the inner end of the controlling or hand lever. Fig. 9 is a perspective view of a part of the mechanism to be hereinafter more fully described. Fig. 10 is a detail fragmentary perspective view of a portion of the carriage release and the coöperating feed rack. Fig. 11 is a front view of the stop which coöperates with the controlling or hand lever, the controlling lever being shown in section. Fig. 12 is a like view of the same showing a different disposition of the hand lever. Fig. 13 is a detail side view of the line spacing pawl and some of its associated parts. Fig. 14 is a detail fragmentary end view of a portion of the platen frame and truck, together with the sustaining means therefor; the parts being shown in normal or printing position. Fig. 15 is a like view of the same, the view illustrating the platen in the raised or inoperative position in which it is sustained by its sustaining means. Fig. 16 is a like view of the same illustrating the platen thrown back off its sustaining means. Fig. 17 is a fragmentary front view of the platen sustaining means and certain of its coöperating mechanism. Figs. 18, 19 and 20 are detail perspective views of portions of the sustaining means. Figs. 21 and 22 are detail face and end views respectively of portions of the sustaining means. Fig. 23 is a plan view with parts broken away of the truck and its coöperating supporting means. Fig. 24 is a front view of the same with parts broken away, the view looking in the direction of the arrow in Fig. 23. Fig. 25 is a detail end view of the truck. Fig. 26 is a fragmentary detail vertical sectional view through the front of the truck and its front supporting tracks. Fig. 27 is a detail end view of the truck and the coöperating supporting means therefor. Fig. 28 is a detail horizontal section view of one of the bearing rollers showing the manner of connecting it to the separator 18. Fig. 29 is a detail end view of the plate having the fixed tracks for the bearing rollers. Fig. 30 is an enlarged transverse sectional view through one of the bearing rollers at the rear of the truck showing the manner of connecting the roller to the separator. Fig. 31 is a plan view of the bearing roller separator at the front of the truck. Fig. 32 is a front view of the same. Fig. 33 is an end view of the same. Fig. 34 is an end view of the upper portion of the machine with parts omitted, the view illustrating the margin stop mechanism, which for clearness of illustration, is omitted from the preceding figures of the drawings. Fig. 35 is a detail front view of the margin stops and their carrier, which are mounted in the top plate of the machine. Fig. 36 is a top view of the same. Fig. 37 is a detail front view of the so-called initial margin stop on the carriage. Fig. 38 is a transverse sectional view of the so-called initial margin stop that is carried by the top plate, the stop being shown in place on its stop rod or carrier and the section being taken on the line x, x, of Fig. 35. Fig. 39 is a detail transverse sectional view of the so-called final margin stop which is carried on the stop rod. Fig. 40 is a detail side view of the catch for securing the stop shown in Fig. 39 in place. Fig. 41 is a detail front view of the final margin stop on the carriage. Fig. 42 is a transverse sectional view of the initial margin stop on the carriage, the section being taken on the line y, y, of Fig. 37. Fig. 43 is a detail transverse sectional view of the final margin stop carried by the stop rod, the stop being shown complete and secured in place upon the stop rod.

In the various views, parts are omitted and broken away to better illustrate other parts of the mechanism.

I have illustrated my invention in a "front strike" typewriting machine, though it should be understood that the various features of the invention may be embodied in other characters of typewriting machines.

The frame of the machine is designated as 1 and it supports a top plate 2, which in the present instance is cut away at the front of the machine, as shown in Fig. 1 to enable the type bars or carriers 3 to reach the printing point.

Projecting upwardly from the top plate are suitable supports 4 to which is secured a plate 5 that has the various tracks formed thereon. Thus a rear inclined grooved track 6 is formed upon the under side of the plate 5 for coöperation with bearing rollers 7, whereas a horizontally disposed track 8 is provided at the front of the plate for coöperation with vertically disposed bearing rollers 9, and a vertical track 10 is provided upon the plate for coöperation with horizontally disposed bearing rollers 11. The rollers 7 are connected by a separator 12 with pins 13 at its ends, each pin projecting through the central opening in the rollers 7. The ends of the pins are headed at 13ª (Fig. 30) in order to prevent the rollers from being accidentally dislodged from the pins. The separator 12 is rounded at its central portion 14 where it coöperates with the bent end 15 of an extension 17 which projects from a roller-carrying bar or bearing roller separator 18 at the front of the plate 5. The connection thus formed between the separator 12 and the extension or arm 17 enables the separator 12 and roller carried thereby to receive a slight swinging movement around the longitudinal axis of the separator 12 but prevents a twisting or buckling of the separator 12 relatively to the separator 18. The roller bar or separator 18 is provided with pivot bearings 18ˣ for the horizontally and vertically disposed pivot pins 19 that are each riveted at one end, 19ˣ (Fig. 28) to the separator 18 and afford supports for the horizontally and vertically disposed rollers 11 and 9 respectively. Thus the separators 12 and 18 are united to travel in a longitudinal direction together and may have a slight transverse movement independently of each other by reason of the connection 14—15 between them. Coöperating with the various bearing rollers is a so-called truck 20, which is provided with a horizontally disposed track 21 that coöperates with the vertically disposed bearing rollers 9, and a vertically disposed track 22 which coöperates with the horizontally disposed bearing rollers 11. These tracks 21 and 22 are at the front of the truck and the bearing rollers which coöperate therewith take the downward and rearward thrust of the truck. The rear of the truck has a depending arm 23 that is provided with an inclined track 24 which coöperates with the bearing rollers 7 at the rear of the truck and these rollers take the upward and forward thrust of the truck. Projecting from the forward portion of the truck beneath the fixed plate 5 is a stud or projection 25, which in the normal position of the parts represented in Fig. 27 is a short distance from the under-face of the plate 5 and limits the upward movement of the truck with relation to the fixed tracks 8 and 10, as will be hereinafter more fully described. In the longitudinal movement of the truck 20 it will bear and roll upon the rollers 7, 9 and 11 which guide it in its movement and the rollers will receive a movement around their axes and will roll upon the fixed tracks and move with their separators independently of the truck and fixed tracks. It should be understood that suitable pins or stops may be provided to limit the movement of the various rollers on their fixed tracks so that they will not escape therefrom and that like pins may be provided upon the track to prevent it from rolling off the bearing rollers.

Projecting forwardly from the truck 20 are apertured ears 26, to which, what is termed herein the platen frame 27, is pivoted at 28. The forward end of the platen frame 27 is provided with a bearing roller 29, which rests upon a track or rail 30 and supports the forward end of the platen frame. Secured to the forward portion of the truck at 31 near one end thereof is a block 32 (shown in detail in Fig. 18) and this block has pivot bearings 33 which receive a pivot that unites one member 34 (shown in detail in Fig. 19) of a sustaining device thereto. This member 34 of the sustaining device is provided with a laterally extending pin 35 that is adapted to bear against the wall 36 of the block 32 as shown in Fig. 16 to limit the forward movement of the sustaining device. The member 34 is contained within the opening 39 formed by the bifurcated portion of the other member 40, the member 39 being apertured at 37 for the reception of a shaft 38 which extends therethrough and which is fixedly seated at its ends within bearings in the other member 40 of the sustaining device. The relative movement of the members 34 and 40 is limited in one direction by a pin 41 which projects from the member 34 and is adapted to engage the member 40, as shown in Fig. 16 of the drawing. A coiled spring 42 surrounds the shaft 38 and has one end thereof connected at 43 (see Figs. 17 and 20) to a collar 44 which may be adjusted around the shaft 38 and secured in the adjusted position by a set screw 45 threaded through an opening in the collar and bearing at its inner end against the shaft 38. The opposite end of the spring 42 is connected to the member 40 of the sustaining device at 42$^a$ and normally exerts a pressure to cause the said members to be moved to the position indicated in Figs. 15 and 16, it being understood that the member 34 is rigidly connected to the shaft 38. The spring may be prevented from binding upon the shaft 38 by a bearing abutment 40$^x$ (Figs. 21 and 22) on the member 40 and against which an end coil of the spring rests to prevent it from contacting on the shaft. The free end 46 of the member 40 constitutes a bearing surface with which the notched portion 47 of the platen frame coöperates and when the platen frame is in the normal position represented in Fig. 14, the spring will be under the greatest tension and the members 34 and 40 of the device will be brought closely together as shown in said figure. When, however, the platen frame is moved to the position shown in Fig. 15, the shaft 38 or pivotal center between the two members will be brought nearer the dead center position where the line of force exerted by the weight of the platen frame is such that the sustaining device maintains the platen frame in the elevated position, notwithstanding the fact that the spring 42 of the device is at this time under less tension than when the platen frame is in the lowered position shown in Fig. 14. It is merely necessary, however, to move the platen frame downwardly a short distance when the direction of the line of force exerted upon the sustaining device by the platen frame will be changed and the spring 42 will then merely operate to counteract the weight of the platen frame but the counteracting tendency of the spring will be insufficient to maintain the platen frame in the elevated position.

From the foregoing it will be observed that a pressure is at all times exerted upon the lower front depending portion of the truck 20 by the platen frame, through the sustaining device, whether the platen frame be in the elevated or in the lowered position, and that the weight of the platen frame and truck is borne at the front of the truck by the vertically disposed bearing rollers 9, whereas there is a lifting tendency at the rear of the truck which maintains under normal conditions, the rear track 24 of the truck against the bearing rollers 7 and thus pressure is exerted to maintain the bearing rollers against the fixed tracks 6. Should any grit or fine particles of dirt become lodged upon the tracks at the front of the truck, they would not, as is ordinarily the case, obstruct a further movement of the carriage but would merely tend to lift the truck against its weight and the weight of the platen frame connected thereto, and permit the rollers to ride freely over them. As soon as the obstruction has been passed in the manner stated, the weight of the parts restores the truck immediately to the normal position and it is adapted to run true upon its roller bearings as before. It will also be observed that the same is true if grit or particles of dirt become lodged within the bearings at the rear of the truck, except that the rear end thereof will, in that event, be projected downwardly around the vertically disposed bearing rollers 21 as a center, in order that the bearing rollers at the rear of the truck may freely pass the obstruction. When the obstruction has been passed, the weight of the platen and truck at the forward portion thereof, will elevate the rear portion with the track 24 to the normal position, and the parts will run true as before. The projecting stud or abutment 25 on the truck limits the upward movement at the front thereof and prevents any considerable displacement of the truck from its fixed tracks; the movement being merely sufficient to enable the rollers to clear any obstruction that may be encountered by them.

The platen frame 27 supports a platen 48, the pivots or shaft 49 of which may be seated in open-mouthed bearings 50, one in each end of the platen frame. The pivots or shaft 49 of the platen is retained in the bearings 50 by a locking piece 51 at each end of the platen frame, each of which is pivoted thereto at 52 and is provided near its rear end with a catch 53 that is pivoted at 54 to the locking piece and is adapted to engage under a lug 55 on the platen frame. This locking engagement is normally maintained by a spring 56 and when the upper end or finger piece of the catch 53 is moved toward the front of the machine the locking or engaging nose of the catch will be released from the projection 55, thus enabling the locking piece 51 to be turned on its pivot 52, when the platen is free to be removed from the platen frame in order that a new platen may be substituted for the old one or to facilitate a repairing of the old platen.

The left-hand end of the platen is provided with the usual line spacing ratchet wheel 57 with which a line spacing pawl 58 coöperates. The line spacing pawl is pivoted at 59 to an upwardly extending lever 60 and has a depending arm 61 that is adapted to bear, when the parts are in the normal position, against any one of the three faces 62 of a controlling piece 63 which is pivoted at 64 to an upwardly extending fixed arm 65. The construction of this controlling piece 63 is such that a movement on its pivot will bring any one of the three faces 62 thereof into the path of the depending arm 61 of the locking pawl to limit its movement toward the front of the machine. The faces 62 enable three different degrees of line spacing movement to be effected by the line spacing pawl by reason of the fact that the three faces are at three different distances from the pivotal center of the controlling piece 63 when they are in the operative position, and thus the throw of the line spacing pawl is changed. A spring 66 (see Fig. 13) is secured at 67 to the platen frame. The upper end of this spring has an angular bend 68 therein for coöperation with the notches 69 in the controlling piece so as to retain the controlling piece in any one of the three positions to which it may be turned. The lever 60 is pivoted at 70 to the platen frame and is restored to the normal position by a coiled spring 71 that is secured at one end 72 to the platen frame and at its opposite end to the lever 60. Coöperating with the lever 60 is a finger 73 which extends laterally from a pivoted hand lever 74 (see Figs. 1 and 8) that is seated on the reduced end 76 (see Fig. 9) of a lever pintle 77, which extends through and has a bearing in the pivot block or support 78, (see Fig. 5). The hand lever may be fixed to the pintle 77 by a headed screw 79, so that in a horizontal movement of the lever it turns with the pintle on the longitudinal axis of the latter. The hand lever is restored to the normal position in this horizontal movement by a spring 80 (Fig. 5) which surrounds the block 78 and is connected at one end 81 to the pivot block and at its opposite end 82 to the hand lever. The block 78 is pivoted at 83 to the platen frame; the pivotal center being at right angles to the pivotal center around which the hand lever receives its horizontal movement so that in effect a gimbal or universal joint is provided for the hand lever. The upward movement of the hand lever with the pivot block is limited by a pin 78* which projects from the block and is adapted to abut against the bottom of the platen frame as indicated in Fig. 5. Extending rearwardly from the pivot block 78 is an arm 84 which coöperates with a lever 85 (Fig. 3) pivoted at 86 to the left-hand end of the platen frame. This lever has a spring 85* connected thereto and the free end of which bears against a pin 85ª projecting from the platen frame and tends to restore the lever 85, the pivot block 78 and the hand lever which is carried thereby to the normal position when the hand lever is released after having been depressed. The rear end of this lever 85 bears at 87 (Fig. 10) against a part carried by an extension 88 of the carriage feed rack 89 which is pivoted at 90 to the platen frame, so that a movement of the hand lever 74 in the direction of the arrow in Fig. 3 will cause the feed rack 89 to be elevated and disengaged from its coöperating feed pinion 91, as illustrated in said figure. The lever 74 is provided with a depending stop 92 that coöperates with a stop 93 on the platen frame for purposes which will now be set forth. When the hand lever 74 has been moved to effect a disengagement of the rack from its pinion in the manner described this depending stop 92 on the lever will be seated within the recessed portion 94 in the stop 93, as shown in Fig. 12. At this time the hand lever 74 is prevented from moving around its vertical axis and the hand lever and carriage are locked together and the movement of the hand lever to this locking position elevates the feed rack 89 from its pinion 91 so that the hand lever is effective to move the carriage in either direction without effecting a movement of said lever around its vertical axis.

The normal disposition of the hand lever 74 with relation to its coöperating stop 93 is illustrated in Fig. 5 and in the full line position in Fig. 11 of the drawings and at this time the hand lever is free to be moved from left to right around its vertical axis. This movement takes the hand lever from the position shown in full lines in Fig. 4 to the dotted line position shown in the same figure. The effect of this movement of the hand lever is to move the lever 60 forward, thereby producing a feed movement of the line spacing pawl 58. When pressure is released from the hand lever, it will be restored to the full line position shown in Fig. 4 by the spring 80. It will be observed that this movement of the hand lever 74 from the full line to the dotted line position shown in Fig. 4, is effective not only to produce a line spacing movement of the platen but is also effective to simultaneously move the carriage from left to right or to restore it to its initial position to begin a line of writing, so that a single movement of the lever is effective to accomplish the two-fold purpose; and a single movement of the hand lever may be employed to release the rack from the pinion as well as to effect a line spacing of the platen and to effect its restoration to the right. Thus if the operator slightly depresses the hand lever during its movement to the right so that it follows an inclined path, as indicated in dotted lines in Fig. 11, the three-fold purpose stated may be accomplished, i. e., disengage the rack, restore the carriage to normal position and line space. From an examination of Fig. 11, it will be seen that the stop or lug 92 in the normal disposition of the parts is just above the corner 93ˣ of the stop 93 and will, if the carriage is dropped to its normal position, prevent an accidental downward movement of the hand lever, which would result in releasing the carriage. The carriage release is thus prevented from being accidentally actuated by a shock or jar incident to dropping the carriage to its normal position. Should, however, the operator desire to effect a line spacing movement of the platen without moving the carriage to the right, it is merely necessary to turn the hand lever 74 to the right with just sufficient force to cause the finger 73 on the hand lever to produce a forward movement of the lever 60 and thus effect a feed movement of the line spacing pawl 58 without moving the carriage. A fixed abutment 95 may be provided for preventing an overthrow by the line spacing pawl and this abutment is in the nature of a pin that projects laterally from a bracket 96 (Figs. 1 and 2) that extends upwardly from the platen frame, and the pin 95 projecting as it does in the path of the line spacing pawl will limit its forward movement and lock the line spacing wheel against further movement.

The hand lever 74 is likewise effective to turn the platen frame back around its pivots 28, it being understood that resistance is afforded to the independent movement of the lever at this time by a stop pin 78ˣ on the pivot block abutting against the platen frame. The hand lever 74 is not only effective to accomplish the functions thus far described, but it is likewise effective to afford a movement of the margin stops past one another when the operator desires to write within the margin, as will now appear.

Upon reference to Figs. 34 to 43 inclusive, it will be observed that the stop rod 97 extends longitudinally of the carriage and is mounted to turn on its longitudinal axis in ears 98 which extend upwardly from the top plate of the machine. The stop rod is graduated on its upper face, as indicated at 99, the graduations corresponding to the carriage scale, and the forward edge of the stop rod is provided with teeth or serrations for securing the stops mounted thereon in place so that they may be set and secured at any graduation on the stop rod. The stop rod carries near the right-hand portion thereof a so-called initial margin stop 100 that has a pointer or finger 100ª which coöperates with the graduations on the scale in order to set the stop at the proper position. This stop comprises a slide that is adapted to move longitudinally upon the rod and has an abutment 101 projecting upwardly therefrom. This abutment is provided with a bevel face 102 for purposes which will hereinafter appear, whereas the left hand face 103 of the abutment extends in a vertical plane. A catch 104 is pivoted to the stop at 105 and is maintained under the tension of a spring 106 which normally forces the nose 107 between the teeth or into one of the serrations in the edge of the stop rod, as illustrated in Fig. 38, whereas the engaging nose of the catch may be removed from between the teeth by the finger piece 108, which forms part of the catch. A second so-called final margin stop 109 is likewise adapted to slide upon the stop rod 97 and is recessed at 110 (see Fig. 39) for the reception of a latch 111 that is provided with a tooth 112 adapted to engage between the teeth of the stop rod and thus secure the final margin stop against longitudinal movement on the stop rod. The catch or slide 111 is likewise provided with a short rod 113 which extends into a chamber 114 of the stop and is threaded at the outer end 115 for the reception of a slide or nut 116. Contained within the chamber 114 and interposed between the end wall thereof and the nut 116 is an expansion spring 117 that forces the catch toward the stop rod and thus maintains the tooth 112 of the catch in locking engagement with the stop rod. The catch is provided with a finger piece 118 by means of which it can be moved against the tension of the spring 117 in order to disengage the tooth 112 from engagement with the stop rod and thereby permit a longitudinal movement of the stop upon the stop rod. The stop 109 is provided with a flat face or abutment 119 with which a stop on the carriage engages, as will hereinafter more clearly appear. Upon reference to Figs. 34 and 36, it will be observed that the abutments 101 and 119 on the two margin stops are in different transverse vertical planes, for purposes which will hereinafter more clearly appear. Secured to the carriage truck by screws 120 is a so-called final margin stop 121 which projects downwardly from the truck and is adapted to coöperate with the abutment 119 on the final margin stop 109. The platen frame or carriage likewise has a bracket 122 secured thereto by a screw 123. This bracket depends from the carriage and is provided with a forwardly projecting arm 124 which is seated upon a cross-rod or shaft 125 so as to form an additional support for the bracket. This bracket is provided with ears 126 in which a pivot 127 is seated, the pivot extending through a stop 128 that is normally maintained in the position illustrated in Figs. 34 and 42, by a coiled expansion spring 129 and bears at one end against the bracket and at the opposite end against a finger piece 130 of the stop 128. This stop on its left-hand side is provided with a bevel face 131, whereas the right-hand face 132 of the stop is in a vertical plane that extends fore and aft of the machine. The normal disposition of the parts is shown in Fig. 34, wherein it will be observed that the stop 128 is normally in the path of the abutment 101 on the initial margin stop so that under ordinary circumstances, the carriage can be returned to the right, and arrested by the initial margin stop. When, however, the operator desires to write within the margin, it is merely necessary to effect a slight movement of the hand-lever 74 in the direction of the arrow of Fig. 34, after the carriage has been arrested at the fixed initial line stop and this movement of the hand lever is effective to tilt or raise the platen frame sufficiently to permit the stop 128 to clear the abutment 101 on the initial margin stop, as represented in dotted lines in Fig. 36, when the carriage can be moved the desired distance past the margin stop to the right. It will be understood, however, that the final margin stop 121 on the carriage finally arrests the movement of the carriage toward the right by being brought into contact with the abutment 119 of the final margin stop on the stop rod. This final margin stop on the stop rod being adjustable, will of course limit the extreme movement of the carriage to the right. After the carriage has been moved to the right in the manner described and the stop 128 is on the right of the abutment 101 of the initial line stop, the operator may continue a line of writing from this point without interruption. Thus when the inclined face 131 of the carriage stop is brought opposite the inclined face 102 on the relatively fixed stop, the stop 128 will be moved against the tension of its spring and deflected to one side to permit a free movement of the carriage in the direction of its feed or from right to left so that the operator may continue to write to a point beyond the initial line stop to the left without interruption. It will be understood that it requires but a very slight movement of the handle 74 in the direction of the arrow in Fig. 34 to effect a stepping over of one margin stop past the other in order that the operator may write within the margin, and that the same hand lever that is effective for the other purposes stated, is likewise effective to accomplish this stepping over of the line stop.

From the foregoing description, it will be understood that the single controlling lever 74 constitutes a combined carriage restoring lever, line spacing lever, carriage releasing lever, a lever for swinging the platen frame around its pivots 28 to inspect the writing and make erasures and means for affording a movement of the carriage beyond the position where it is normally arrested by the margin stops, in order that the operator may write within the margin. It is likewise effective, not only to produce these various results separately, but may be utilized to simultaneously effect a line spacing movement of the platen and the release and a restoration of the carriage to the right by a single movement of this lever. It should also be understood that any one or more features of the invention may be employed without the others and that they, or any of them, may be employed in any character of typewriting machine and the various changes may be made without departing from the spirit of my invention.

Though no specific mention has been made thereto, it should be understood that the carriage is preferably a power driven carriage and that suitable carriage feed or escapement mechanism coöperates with the feed pinion 91 or the feed wheel 133 operatively connected thereto.

From a broad aspect of the invention, the so-called truck and platen frame may be considered together as the carriage and while I have referred throughout to bearing rollers, it should be understood that the term is meant to apply to anti-friction balls as well as rollers of the character shown, though in practice I prefer the latter.

What I claim as new and desire to secure by Letters Patent, is:—

1. In a typewriting machine, the combination of a carriage; feed mechanism therefor; line spacing devices; a combined carriage release and line spacing lever; and means whereby said lever is operative for releasing the carriage from its feed mechanism and for effecting a line spacing of the platen by a single operation, or is operative either as a carriage releasing lever or as a line spacing lever without operating for the other purpose.

2. In a typewriting machine, the combination of a carriage; feed mechanism therefor; line spacing devices; a combined carriage release, carriage return and line spacing lever; and means whereby said lever is operative at a single operation either for releasing the carriage and for effecting a line spacing of the platen, or for releasing the carriage alone, or for releasing and returning the carriage, or for releasing and returning the carriage and line spacing.

3. In a typewriting machine, the combination with a carriage and feed mechanism therefor, of a lever mounted to move in a plurality of paths and means coöperating with said lever merely to release the carriage when the lever is moved in one path and merely to effect a line spacing movement of the platen when the lever is moved in another path.

4. In a typewriting machine, the combination with a carriage and feed mechanism therefor, of a lever mounted to move in a plurality of directions, and means coöperating with said lever merely to release the carriage when the lever is moved in one direction and merely to effect a line spacing movement of the platen when the lever is moved in another direction or to effect a line spacing and concurrent return of the carriage when the lever is moved in the last named direction, as may be desired.

5. In a typewriting machine, the combination with a carriage and feed mechanism therefor, a lever which is mounted to move in three paths, means coöperating with said lever merely to release the carriage when the lever is moved in one path; merely to effect a line spacing movement of the platen when the lever is moved in another path and to concurrently effect a line spacing movement of the platen and a return of the carriage by a single movement of said lever in a third path.

6. In a typewriting machine, the combination with a carriage and feed mechanism therefor, a lever mounted to move in three paths, means coöperating with said lever merely to release the carriage when the lever is moved in one path; to merely effect a line spacing movement of the platen or to effect such line spacing and a return of the carriage as may be desired when the lever is moved in another path and to effect a release of the carriage, a line spacing movement of the platen and a return of the carriage by a single movement of the lever in a third path.

7. In a typewriting machine, the combination with a carriage and feed mechanism therefor, a spring restored lever which has a movement in two directions, means coöperating with said lever to release the carriage when the lever is moved in one path and to effect a line spacing movement of the platen when the lever is moved in another path, and locking means which automatically coöperate with said lever when it is moved in one path, to prevent its movement in the other path specified.

8. In a typewriting machine, the combination with a carriage and feed mechanism therefor, a spring restored lever mounted to move in three paths, means coöperating with said lever to release the carriage when the lever is moved in one path, to effect a line spacing movement of the platen when the lever is moved in another path, and to release the carriage, line space and return the carriage when the lever receives a single movement in a third path, and locking means which automatically coöperates with said lever when it is moved in the first mentioned direction, to prevent a line spacing movement of the lever and which affords a free movement of the lever independently of the locking means when said lever is moved in the third path.

9. In a typewriting machine, the combination with a carriage and feed mechanism therefor, a spring restored lever mounted to move in three paths, means coöperating with said lever to release the carriage when the lever is moved in one path; to merely effect a line spacing movement of the platen or to line space and return the carriage as may be desired when the lever is moved in another path and to release the carriage, line space and return the carriage when the lever is moved in the third path, and a stop with which said lever engages when it is moved to merely effect a release of the carriage and so that at this time the carriage may be moved in either direction through said lever without line spacing.

10. In a typewriting machine, the combination of a carriage, a mounting for said carriage enabling the latter to be swung up from normal position, feed mechanism for said carriage, a lever carried by the carriage, and means coöperating with said lever to render it effective to swing the carriage; to release the carriage from its feed mechanism; to return the carriage to the right and to turn the platen for line spacing, said means enabling each of said carriage releasing, carriage swinging and line spacing operations to be effected by said lever independently of the others.

11. In a typewriting machine, the combination of a carriage, carriage releasing mechanism, a combined line spacing and carriage release lever mounted to move in two directions, and operative to actuate said carriage releasing mechanism, and means for automatically locking said lever against movement in one direction when it is moved in the other direction.

12. In a typewriting machine, the combination of a carriage, line spacing mechanism, a combined line spacing and carriage return lever mounted to move in two directions and operative to actuate the line spacing mechanism and return the carriage, and means for automatically locking said lever against movement in one direction when it is moved in the other direction, whereby the return of the carriage and line spacing can be effected independently of each other by the same lever when desired.

13. In a typewriting machine, the combination of a carriage, line spacing mechanism, carriage releasing mechanism, and a combined line spacing and carriage return and release lever pivoted to move in two directions and operative to actuate the line spacing mechanism to actuate the carriage releasing mechanism and to return the carriage, and means for automatically locking said lever against movement in one direction when it is moved in another direction.

14. In a typewriting machine, the combination of a combined carriage release, carriage return and line spacing lever pivoted on two centers at substantially right angles to each other, a line space pawl actuated by a pivotal movement of said lever around one center, and carriage releasing means controlled by the movement of said lever around the other pivotal center.

15. In a typewriting machine, the combination of a combined carriage release, carriage return and line spacing lever pivoted on two centers at substantially right angles to each other, a line space pawl actuated by a pivotal movement of said lever around one center, carriage releasing means controlled by the movement of said lever around the other pivotal center, and means for preventing a movement of the lever around one pivotal center when it has received a movement around the other pivotal center.

16. In a typewriting machine, the combination of a combined carriage release, carriage return and line spacing lever, a universal joint upon which said lever is mounted and carriage release and line spacing means controlled by said lever.

17. In a typewriting machine, the combination of a combined carriage release, carriage return and line spacing lever, a universal joint upon which said lever is mounted, carriage release and line spacing means controlled by said lever, and means for automatically locking the lever against movement in one direction when it is moved in another direction.

18. In a typewriting machine, the combination of a carriage that is adapted to move or swing in a direction transverse to the travel thereof, a stop that normally arrests the movement of said carriage, a combined carriage return and carriage release lever that is operable to effect a transverse movement of the carriage to enable it to clear the said stop, and carriage releasing means coöperating with said lever.

19. In a typewriting machine, the combination of a carriage that is adapted to move or swing in a direction transverse to the travel thereof, a stop that normally arrests the movement of said carriage, a combined carriage return, and line spacing lever that is operable to effect a transverse movement of the carriage to enable it to clear the said stop, and line spacing means coöperating with said lever.

20. In a typewriting machine, the combination of a carriage that is adapted to move or swing in a direction transverse to the travel thereof, a stop that normally arrests the movement of said carriage, a combined carriage return, carriage release and line spacing lever that is operable to effect a transverse movement of the carriage to enable it to clear the said stop, and line spacing and carriage releasing means coöperating with said lever.

21. In a typewriting machine, the combination of a swinging platen frame, a spring which partly supports the platen frame to counteract the weight thereof, and a sustaining device which is operatively connected to said spring and coöperates with the platen frame to sustain it in the raised position through the tension exerted by said spring.

22. In a typewriting machine, the combination of a swinging platen frame, a spring for counteracting the weight thereof, and a sustaining device which is operatively connected to said spring and coöperates with the platen frame to render the spring effective to counteract the weight of the platen frame when it is in the lowered position and to sustain the platen frame when it is in the raised position.

23. In a typewriting machine, the combination of a swinging platen frame, a spring for counteracting the weight thereof, and a two-part pivotally united sustaining device which is operatively connected to the spring and which coöperates with the platen frame and moves relatively thereto to change the direction of the line of force applied by the weight of the platen frame, whereby when the platen frame is in the lowered position the spring will counteract the weight thereof, whereas when the platen frame is in the raised position it will be retained in such position.

24. In a typewriting machine, the combination of a swinging platen frame, a spring for counteracting the weight thereof, a two-part pivotally supported and pivotally united sustaining device which is operatively connected to the spring and which coöperates with the platen frame and moves relatively thereto, to change the direction of the line of force applied by the weight of the platen frame, means for limiting the movement of the parts of said sustaining device one with relation to the other, and means for limiting the movement of said sustaining device on its pivotal support, whereby when the platen frame is in the lowered position the spring will counteract the weight thereof, whereas when the platen frame is in the raised position it will be retained in such position.

25. In a typewriting machine, the combination of a carriage, roller bearing tracks and bearing rollers therefor, certain of the bearing rollers normally bearing upwardly on a fixed bearing track to support the weight of the carriage, whereas others normally bear downwardly on a fixed track.

26. In a typewriting machine, the combination of a carriage, roller bearing tracks and bearing rollers therefor, certain of the bearing rollers normally bearing upwardly on a fixed bearing track to support the carriage, whereas others normally bear downwardly on a fixed track, the carriage being maintained in contact with the rollers and the rollers being normally maintained in contact with their tracks by the weight of the carriage.

27. In a typewriting machine, the combination of a carriage, roller bearing tracks and bearing rollers therefor, certain of the bearing rollers normally bearing upwardly on a fixed bearing track to support the carriage, whereas others normally bear downwardly on a fixed track, the carriage being maintained in contact with the rollers and the rollers being normally maintained in contact with their tracks by the weight of the carriage, the parts being constructed and arranged so that the carriage may receive a slight movement independently of the fixed bearing tracks and in a direction transverse to its feed.

28. In a typewriting machine, the combination of a carriage truck having roller bearing tracks thereon, a platen frame carried by the truck, fixed roller bearing tracks and loosely disposed bearing rollers interposed between bearing tracks on the truck and said fixed bearing tracks, certain of said rollers bearing upwardly against a fixed track to support the truck, whereas others bear downwardly against a fixed track.

29. In a typewriting machine, the combination of a carriage truck having roller bearing tracks thereon, a platen frame carried by the truck, fixed roller bearing tracks, and loosely disposed bearing rollers interposed between bearing tracks on the truck and said fixed bearing tracks, certain of said rollers bearing upwardly against a fixed track to support the truck, whereas others bear downwardly against a fixed track and all of said rollers bearing against their tracks by the weight of the carriage.

30. In a typewriting machine, the combination of a carriage truck having roller bearing tracks thereon, a platen frame carried by the truck, fixed roller bearing tracks, and loosely disposed bearing rollers interposed between bearing tracks on the truck and said fixed bearing tracks, certain of said rollers bearing upwardly against a fixed track to support the truck, whereas others bear downwardly against a fixed track, and all of said rollers bearing against their tracks by the weight of the carriage, the parts being constructed and arranged so that the truck may receive a slight movement independently of the fixed tracks and in a direction transverse to the direction of the feed of the carriage.

31. In a typewriting machine, the combination of a carriage truck having roller bearing tracks thereon, a platen frame carried by the truck, fixed roller bearing tracks, and loosely disposed bearing rollers interposed between the bearing tracks on the truck and said fixed bearing tracks, certain of said rollers bearing upwardly and forwardly against a fixed track to receive the upward and forward thrust of the truck, whereas others bear downwardly against a fixed track to take the downward thrust of the truck.

32. In a typewriting machine, the combination of a carriage truck having roller bearing tracks thereon, a platen frame carried by the truck, fixed roller bearing tracks, and loosely disposed bearing rollers interposed between bearing tracks on the truck and said fixed bearing tracks, certain of said rollers bearing upwardly and forwardly against a fixed track to receive the upward and forward thrust of the truck, whereas others bear downwardly against a fixed track to take the downward thrust of the truck and all of said rollers bearing against their tracks by the weight of the carriage.

33. In a typewriting machine, the combination of a carriage truck having roller bearing tracks thereon, a platen frame carried by the truck, fixed roller bearing tracks, and loosely disposed bearing rollers interposed between bearing tracks on the truck and said fixed bearing tracks, certain of said rollers bearing upwardly and forwardly against a fixed track to support the truck and to receive the upward and forward thrust of the truck, whereas others bear downwardly against a fixed track to take the downward thrust of the truck, and all of said rollers bearing against their tracks by the weight of the carriage, the parts being constructed and arranged so that the truck may receive a slight movement independently of the fixed tracks and in a direction transverse to the direction of the feed of the carriage.

34. In a typewriting machine, the combination of a carriage truck having roller bearing tracks thereon, a platen frame pivoted thereto and adapted to swing transversely thereof for upper and lower case printing, fixed roller bearing tracks, and loosely disposed bearing rollers interposed at front and rear of the truck between bearing tracks on the trucks and said fixed bearing tracks, the said rollers at the rear of the truck bearing upwardly against the fixed track to support the truck, whereas those at the front of the truck bear downwardly against a fixed track.

35. In a typewriting machine, the combination of a carriage truck having roller bearing tracks at the front and rear thereof, a platen frame carried by said truck, fixed roller bearing tracks, loosely disposed rollers interposed between the tracks at the front and rear of the truck and the fixed tracks and adapted to move independently of the truck, the bearing rollers at the front of the truck bearing downwardly and rearwardly against the fixed tracks to receive the downward and rearward thrust of the carriage, whereas the rollers at the rear of the truck bear upwardly and forwardly against the fixed track so as to receive the upward and forward thrust of the carriage, and means for connecting said rollers to move together.

36. In a typewriting machine, the combination of a carriage truck having roller bearing tracks at the front and rear thereof, a platen frame carried by said truck, fixed roller bearing tracks, loosely disposed rollers interposed between the tracks at the front and rear of the truck and the fixed tracks, the bearing rollers at the front of the truck bearing downwardly and rearwardly against the fixed tracks to receive the downward and rearward thrust of the carriage, whereas the rollers at the rear of the truck bear upwardly and forwardly against the fixed track so as to receive the upward and forward thrust of the carriage, and means for connecting said rollers to move together and all of said rollers bearing against their tracks by the weight of the platen frame and truck.

37. In a typewriting machine, the combination of a carriage truck having roller bearing tracks at the front and rear thereof, a platen frame carried by said truck, fixed roller bearing tracks, loosely disposed rollers interposed between the tracks at the front and rear of the truck and the fixed tracks, the bearing rollers at the front of the truck bearing downwardly and rearwardly against the fixed tracks to receive the downward and rearward thrust of the carriage, whereas the rollers at the rear of the truck bear upwardly and forwardly against the fixed track so as to support the truck and receive the upward and forward thrust of the carriage, and means for connecting said rollers to move together, and all of said rollers bearing against their tracks by the weight of the platen frame and truck, the parts being so constructed and arranged that the truck may be elevated at the front thereof independently of the said front fixed bearing track.

38. In a typewriting machine, the combination of a carriage truck having roller bearing tracks at the front and rear thereof, a platen frame pivoted to said truck, fixed roller bearing tracks, and loosely disposed rollers interposed between the tracks at the front and rear of the truck and the fixed tracks, the bearing rollers at the front of the truck bearing downwardly and rearwardly against the fixed tracks to receive the downward and rearward thrust of the carriage, whereas the rollers at the rear of the truck bear upwardly and forwardly against the fixed track, so as to support the truck and receive the upward and forward thrust of the carriage, roller separators for maintaining a fixed relation between the various rollers, all of said rollers bearing against their tracks by the greater weight of the platen frame and truck at the front portion of the truck, the parts being so constructed and arranged that the truck may be elevated at the front thereof independently of the said front fixed bearing track, and means for limiting the said independent movement of the truck.

39. In a typewriting machine, the combination with a platen frame, of a carriage truck having an inclined roller bearing track at the rear thereof and vertically and horizontally disposed tracks at the front thereof, corresponding fixed roller bearing tracks, and bearing rollers interposed between the said tracks on the truck and the fixed tracks.

40. In a typewriting machine, the combination with a platen frame, of a carriage truck having an inclined roller bearing track at the rear thereof and vertically and horizontally disposed tracks at the front thereof, corresponding fixed roller bearing tracks, and bearing rollers interposed between the said tracks on the truck and the fixed tracks, the parts being so disposed that the weight of the platen frame maintains the rollers and tracks in contact with each other.

41. In a typewriting machine, the combination with a platen frame, of a carriage truck having an inclined roller bearing track at the rear thereof and vertically and horizontally disposed tracks at the front thereof, corresponding fixed roller bearing tracks, and bearing rollers interposed between the said tracks on the truck and the fixed tracks, the parts being so disposed that the weight of the platen frame maintains the rollers and tracks in contact with each other, and a slight vertical movement of the front and rear of the truck in opposite directions may take place.

42. In a typewriting machine, the combination with a laterally-movable carriage, of two sets of rollers on which the carriage runs, a race-bar for the rollers connected to the carriage and having an upwardly-facing bearing at its rear, and a downwardly-facing bearing at its front, and an opposable race-bar for the rollers having an upwardly-facing bearing at its front and a downwardly-facing bearing at its rear, substantially as set forth.

43. In a typewriting machine, the combination with a laterally-movable carriage and platen, of a roller-bearing guide and support for the carriage, comprising two sets of rollers arranged in rear of the platen in substantially the same horizontal plane, and roller-races arranged to support the carriage by downward pressure on the front set of rollers and upward pressure on the rear set of rollers, substantially as set forth.

44. In a typewriting machine, the combination with a carriage and feed mechanism therefor, of a combined carriage release and carriage return lever, and means whereby the lever is operative for releasing the carriage from the feed mechanism and for returning the carriage by a single movement of said lever in the general direction of the travel of the carriage, and whereby said lever is rendered effective either as a carriage release lever or as a carriage returning lever and whereby an operation of said lever for either purpose is afforded without operating for the other purpose.

45. In a typewriting machine, the combination of a swinging platen frame, a counteracting spring, and connections controlled thereby, said counteracting spring and connections partly supporting the weight of said platen frame when it is in its normal position and wholly sustaining the platen frame when it is in a swung back or elevated position.

Signed at the borough of New York, city of New York, in the county of New York, and State of New York, this 17th day of August, A. D. 1903.

GEORGE B. WEBB.

Witnesses:
K. V. DONOVAN,
CHARLES E. SMITH.

Copies of this patent may be obtained for five cents each, by addressing the "Commissioner of Patents, Washington, D. C."